S. B. SCHEPPMANN.
WATERING TANK AND HEATER.
APPLICATION FILED JULY 28, 1914.
1,135,851.
Patented Apr. 13, 1915.
2 SHEETS—SHEET 1.
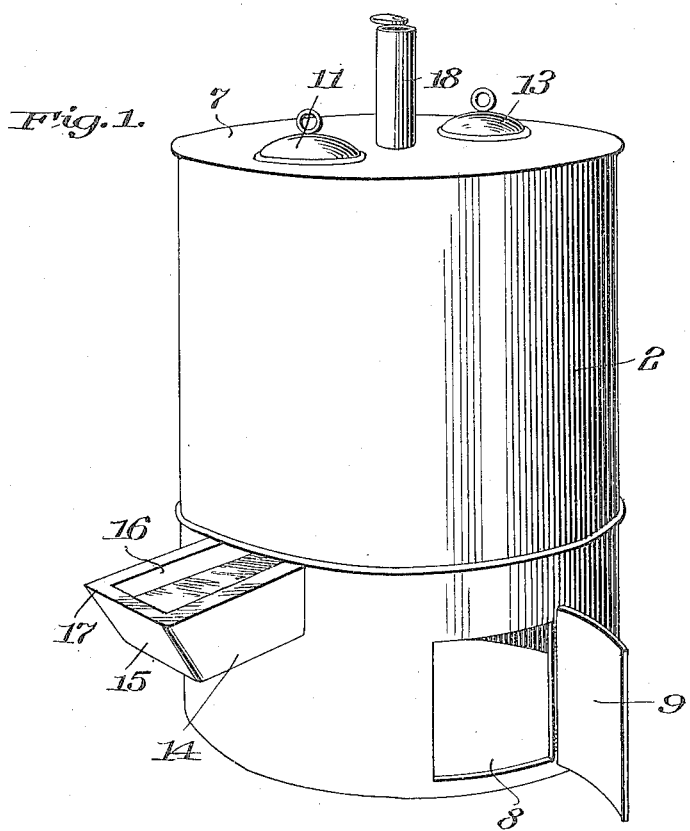
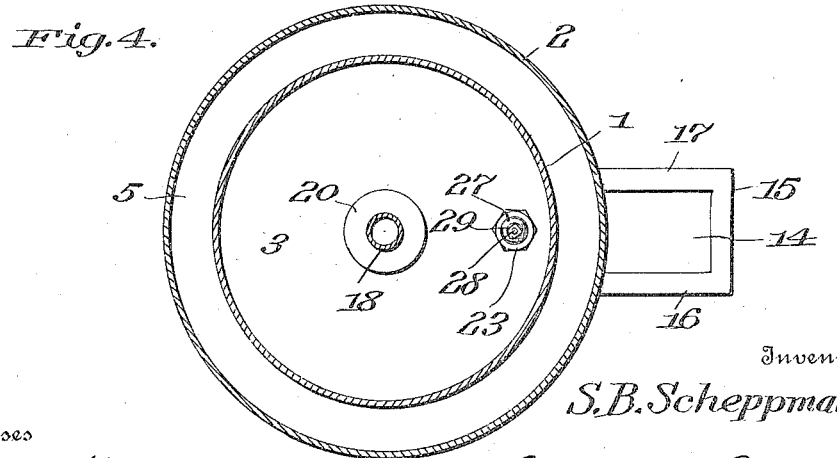
Witnesses
Gerald Hennessy
J W Garner
Inventor
S. B. Scheppmann,
By Victor J. Evans
Attorney

S. B. SCHEPPMANN.
WATERING TANK AND HEATER.
APPLICATION FILED JULY 28, 1914.

1,135,851.

Patented Apr. 13, 1915.
2 SHEETS—SHEET 2.

Witnesses
Gerald Hennesy
J. W. Garner

Inventor
S. B. Scheppmann,
By Victor J. Evans
Attorney

UNITED STATES PATENT OFFICE.

SAMUEL B. SCHEPPMANN, OF ST. PAUL, MINNESOTA.

WATERING-TANK AND HEATER.

1,135,851.

Specification of Letters Patent. Patented Apr. 13, 1915.

Application filed July 28, 1914. Serial No. 853,775.

*To all whom it may concern:*

Be it known that I, SAMUEL B. SCHEPP-MANN, a citizen of the United States, residing at St. Paul, in the county of Ramsey and State of Minnesota, have invented new and useful Improvements in Watering-Tanks and Heaters, of which the following is a specification.

This invention is an improved tank for watering stock or poultry and means for heating the tank to prevent the water from freezing in cold weather, the invention consisting in the construction, combination and arrangement of devices hereinafter described and claimed.

Figure 2:
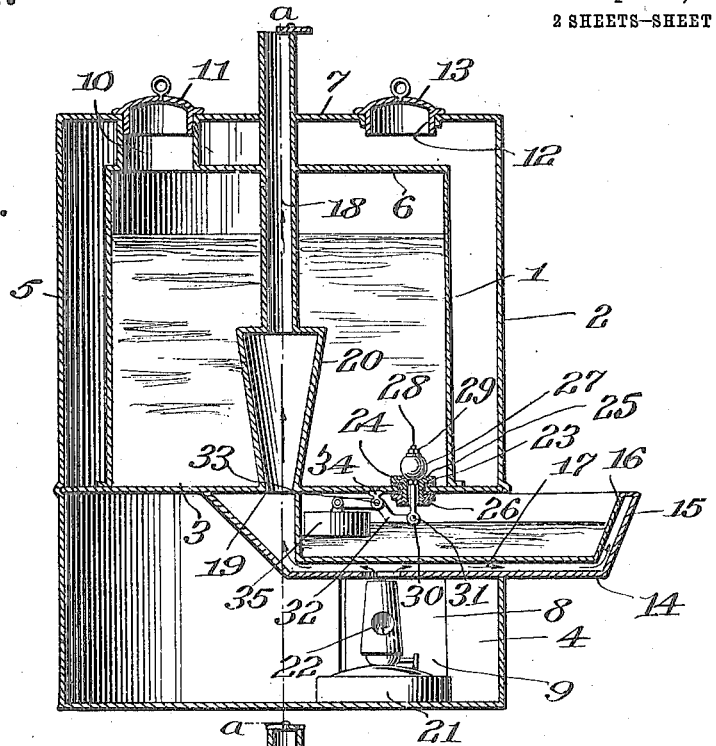
Figure 3:
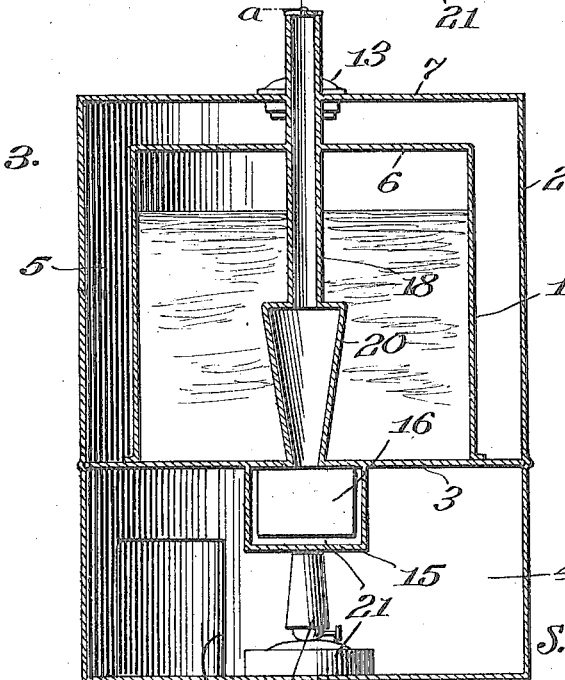

In the accompanying drawings:—Figure 1 is a perspective view of a watering tank and heater constructed in accordance with my invention. Fig. 2 is a vertical central sectional view of the same. Fig. 3 is a sectional view on a plane at right angles to that of Fig. 2 and on the plane indicated by the line *a—a* of Fig. 2. Fig. 4 is a horizontal sectional view of the same.

The tank 1 which is here shown as cylindrical in form is arranged in the upper portion of a cylindrical casing 2 and bears on a plate or diaphragm 3 which divides the casing into a heating chamber 4 and an insulating chamber 5. The wall of the tank is spaced from that of the casing so that a dead air space is formed between the tank and the casing, said dead air space also extending above the tank, the top 6 of the tank being spaced below the top 7 of the casing as shown. The lower portion of the casing has an opening 8 and a hinged door 9 to close said opening. A filling tube 10 connects the tops of the tank and the casing and a closure 11 is provided for said filling tube. The casing also has an opening 12 in its top and a closure 13 for said opening.

A trough 14 is under the bottom of the tank and projects outwardly from one side of the casing so that poultry or stock can have access to the trough to drink therefrom. This trough has an outer wall 15 and an inner wall 16 which is spaced therefrom so that a heating chamber 17 is formed between the inner and outer wall of the trough. A vertical flue 18 is in the center of the tank and extends up through the top of the casing and has its lower end connected to the rear portion of the heating chamber 17 as at 19. This flue has an inverted conical enlarged lower portion 20 which forms a heating drum in the lower portion of the tank, as will be understood. A lamp or other suitable heater 21 is arranged in the lower chamber 4 of the casing and below the trough, its chimney 22 having its upper end arranged just below an opening in the bottom of the outer wall of the trough so that the heat from the lamp passes directly up through the heating chamber 17 and hence circulates entirely around the trough and passes up through the flue in the center of the tank. Hence the water in the tank and in the trough is prevented from freezing.

The bottom of the tank, at a point above the center of the trough is provided with an opening in which is arranged a tubular sleeve 23. The upper end of the sleeve is enlarged annularly as at 24 and formed with an upwardly enlarging valve seat 25. A tubular lock nut 26 is threaded on the sleeve and bears against the under side of the bottom of the tank and a suitable gasket or other packing may be interposed between the head 24 of the sleeve and the tank bottom to prevent leakage.

A valve 27 is preferably substantially spherical and is made of rubber and arranged to close the valve seat 25. A rod 28 passes through the center of the valve, is provided with clamping nuts 29 to secure the valve thereon and the lower end of the said rod is formed with an eye 30 which is engaged by a pin 31 that projects from one side of a lever 32. This lever is fulcrumed as at 33 to the lower end of a bracket 34 which depends from the bottom of the tank and in the trough and to the inner end of said sleeve is connected a float 35. The float when the water is low in the trough descends by its own weight and thereby raises the valve, thus opening the sleeve or nipple 23 and permitting water to be discharged from the tank into the trough. When the water reaches the desired level in the trough the float by moving upwardly causes the lever 32 to draw the valve 27 downwardly and thereby close the nipple or sleeve and thus cut off further supply of water to the trough. Hence the trough is automatically supplied with water from the tank, from time to time as water is used from the trough, as will be understood.

My improved tank and heater may be made of any suitable size for use either by poultry or live stock and may be made of any suitable material.

Having thus described my invention, I claim:—

A tank, a trough below and fed by the tank said trough extending under the bottom of the tank and also projecting, at its outer end, beyond one side of the tank and being provided with spaced inner and outer walls forming a heating chamber between them, a flue leading from the rear portion of said heating chamber and extending through the tank, a casing in which the tank and inner portion of the trough are located and a heater also in the casing and below the tank, said heater having a chimney arranged to discharge heated air into the heating chamber of the trough.

In testimony whereof I affix my signature in presence of two witnesses.

SAMUEL B. SCHEPPMANN.

Witnesses:
FRANK T. RILEY,
H. BILLENBERY.

Copies of this patent may be obtained for five cents each, by addressing the "Commissioner of Patents, Washington, D. C."